(12) United States Patent
Xu et al.

(10) Patent No.: US 11,596,012 B2
(45) Date of Patent: Feb. 28, 2023

(54) APPARATUS AND METHOD FOR SELECTING CENTRALIZED UNIT-USER PLANE IN WIRELESS COMMUNICATION SYSTEM

(71) Applicant: Samsung Electronics Co., Ltd., Suwon-si (KR)

(72) Inventors: Lixiang Xu, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,225

(22) PCT Filed: Jan. 9, 2019

(86) PCT No.: PCT/KR2019/000327
§ 371 (c)(1),
(2) Date: Jul. 9, 2020

(87) PCT Pub. No.: WO2019/139345
PCT Pub. Date: Jul. 18, 2019

(65) Prior Publication Data
US 2021/0068183 A1    Mar. 4, 2021

(30) Foreign Application Priority Data

Jan. 11, 2018 (CN) .......................... 201810029412.6

(51) Int. Cl.
*H04W 56/00* (2009.01)
*H04W 76/15* (2018.01)
(Continued)

(52) U.S. Cl.
CPC .......... *H04W 76/15* (2018.02); *H04L 61/5007* (2022.05); *H04W 76/27* (2018.02); *H04W 88/085* (2013.01)

(58) Field of Classification Search
CPC ... H04W 76/15; H04W 76/27; H04W 88/085; H04L 81/2007
(Continued)

(56) References Cited

U.S. PATENT DOCUMENTS 10,932,168 B2 *   2/2021   Yang ................. H04W 36/0055
2019/0075552 A1 *   3/2019   Yu ......................... H04W 76/10
(Continued)

FOREIGN PATENT DOCUMENTS

CN         107371155 A      11/2017

OTHER PUBLICATIONS

3rd Generation Partnership Project; Technical Specification Group Radio Access Network; Study of separation of NR Control Plane (CP) and User Plane (UP) for split option 2; (Release 15), 3GPP TR 38.806 V15.0.0 (Dec. 2017), 21 pages.
(Continued)

*Primary Examiner* — Sai Ming Chan (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The embodiments of the present disclosure provide a method for operating a centralized unit-control plane (CU-CP). The method includes acquiring, by the CU-CP in a base station, information regarding at least one centralized unit-user plane (CU-UP) connected to a distributed unit (DU), and selecting, by the CU-CP, a CU-UP, among the at least one
(Continued)

CU-UP, suitable for an access of a user equipment, according to the information regarding the at least one CU-UP connected to the DU.

14 Claims, 7 Drawing Sheets

(51) Int. Cl.
　　*H04W 76/27*　　(2018.01)
　　*H04W 88/08*　　(2009.01)
　　*H04L 61/5007*　(2022.01)

(58) Field of Classification Search
　　USPC .......................................................... 370/331
　　See application file for complete search history.

(56) References Cited

U.S. PATENT DOCUMENTS

2019/0082367 A1　　3/2019　Lin et al.
2020/0382240 A1*　12/2020　Centonza .............. H04W 76/12

OTHER PUBLICATIONS

Huawei, "UE initial access procedure for CP-UP separation", 3GPP TSG RAN WG3 meeting #97bis, Aug. 9-13, 2017, R3-173714, 5 pages.
LG Electronics Inc., "Issues on Security for CU-CP and CU-UP Separation", 3GPP TSG-RAN WG3 Meeting #97bis, Oct. 9-13, 2017, R3-173649, 2 pages.
Intel, "Network slicing support for RAN deployments with CU-CP and CU-UP separation", 3GPP TSG-RAN WG3#98, Nov. 27-Dec. 1, 2017, R3-174632, 4 pages.
International Search Report dated Apr. 19, 2019 in connection with International Patent Application No. PCT/KR2019/000327, 3 pages.
Written Opinion of the International Searching Authority dated Apr. 19, 2019 in connection with International Patent Application No. PCT/KR2019/000327, 6 pages.
Communication pursuant to Article 94(3) EPC dated Sep. 30, 2021 in connection with European Patent Application No. 19 738 666.7, 5 pages.
Supplementary European Search Report in connection with European Application No. 19738666.7 dated Nov. 3, 2020, 11 pages.
European Patent Office, "Communication pursuant to Article 94(3) EPC," dated Nov. 30, 2022, in connection with European Patent Application No. EP19738666.7, 6 pages.
China National Intellectual Property Administration, "Office Action," dated Dec. 1, 2022, in connection with Chinese Patent Application No. CN201810029412.6, 33 pages.
Ericsson et al., "Xn handover in disaggregated gNB with E1 interface," 3GPP TSG-RAN WG3 AH #2 Tdoc R3-172537, Qingdao, P. R. China, Jun. 27-29, 2017, 4 pages.
Intel Corporation, "Xn Handover in NG-RAN with separated CP and UP," 3GPP TSG RAN WG3 Meeting #97bis R3-173807, Prague, Czech, Oct. 9-13, 2017, 4 pages.
3GPP TR 38.806 V15.0.0 (Dec. 2017); Technical Report; 3rd Generation Partnership Project; Technical Specification Group Radio Access Network; Study of separation of NR Control Plane (CP) and User Plane (UP) for split option 2; (Release 15); 22 pages.

* cited by examiner

APPARATUS AND METHOD FOR SELECTING CENTRALIZED UNIT-USER PLANE IN WIRELESS COMMUNICATION SYSTEM

CROSS-REFERENCE TO RELATED APPLICATIONS

This application is a 371 of International Application No. PCT/KR2019/000327 filed on Jan. 9, 2019, which claims priority to Chinese Patent Application No. 201810029412.6 filed on Jan. 11, 2018, the disclosures of which are herein incorporated by reference in their entirety.

BACKGROUND

1. Field

Embodiments of the present disclosure relate to wireless communication technology, and more particularly, to a method and base station for selecting a centralized unit-user plane (CU-UP).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An aspect of the present disclosure to provide an apparatus and method for selecting a centralized unit-user plane (CU-UP) more effectively.

SUMMARY

According to an aspect of the embodiments of the present disclosure, there is provided method for operating a centralized unit-control plane (CU-CP) including, acquiring, by the CU-CP in a base station, information regarding at least one centralized unit-user plane (CU-UP) connected to a distributed unit (DU), and selecting, by the CU-CP, a CU-UP, among the at least one CU-UP, suitable for an access of a user equipment, according to the information regarding the at least one CU-UP connected to the DU.

According to an aspect of the embodiments of the present disclosure, there is provided a method for selecting a CU-UP, including, acquiring, by a CU-CP in a base station, information of at least one CU-UP connected to a DU, and selecting, by the CU-CP, a CU-UP suitable for a UE's access from the at least one CU-UP, according to the acquired information of the at least one CU-UP connected to the DU.

In an example, the information of the at least one CU-UP connected to the DU may be acquired by the CU-CP from the DU.

In an example, acquiring, by the CU-CP, the information of the at least one CU-UP connected to the DU from the DU may comprise: receiving, by the CU-CP, an F1 setup request message from the DU, wherein the F1 setup request message comprises the information of the at least one CU-UP connected to the DU, which comprises at least one of an identity of the at least one CU-UP, an Internet protocol (IP) address of the at least one CU-UP, and a name of the at least one CU-UP.

In an example, the information of the at least one CU-UP connected to the DU may further comprise at least one of a load of the at least one CU-UP, a load of a transport layer between the DU and the at least one CU-UP, and information on whether an interface between the DU and the at least one CU-UP is available.

In an example, acquiring, by the CU-CP, the information of the at least one CU-UP connected to the DU from the DU may comprise: receiving, by the CU-CP, an F1 access protocol (AP) message from the DU, wherein the F1 AP message comprises the information of the at least one CU-UP connected to the DU or information of at least one CU-UP selectable for the UE, which comprises at least one of an identity of the at least one CU-UP, an IP address of the at least one CU-UP, and a name of the at least one CU-UP.

In an example, the information of the at least one CU-UP connected to the DU or the information of the at least one CU-UP selectable for the UE may further comprise at least one of a load of the at least one CU-UP, and a load of a transport layer between the DU and the at least one CU-UP.

According to another aspect of the embodiments of the present disclosure, there is provided method for operating a centralized unit-control plane (CU-CP), including, acquiring, by a centralized unit-control plane (CU-CP) in a base station, information regarding distributed units (DUs) connected to at least one centralized unit-user plane (CU-UP), and selecting, by the CU-CP, a CU-UP, among the at least one CU-UP, suitable for an access of a user equipment (UE), according to the information regarding the DUs connected to the at least one CU-UP.

According to another aspect of the embodiments of the present disclosure, there is provided a method for selecting a CU-UP, including, acquiring, by a CU-CP in a base station, information of DUs connected to at least one CU-UP, and selecting, by the CU-CP, a CU-UP suitable for a UE's access from the at least one CU-UP, according to the acquired information of the DUs connected to the at least one CU-UP.

In an example, the information of the DUs connected to the at least one CU-UP may be acquired by the CU-CP from the at least one CU-UP.

In an example, acquiring, by the CU-CP, the information of the DUs connected to the at least one CU-UP from the at least one CU-UP may comprise: transmitting, by the CU-CP, an E1 setup request message to each of the at least one CU-UP, wherein the E1 setup request message comprises an identity of the CU-CP and a list of Tracking Areas (TAs) supported by the CU-CP; and receiving, by the CU-CP, an E1 setup response message from the CU-UP, wherein the E1 setup response message comprises an identity of the CU-UP and a list of TAs supported by the CU-UP, and the E1 setup response message further comprises information of DUs connected to the CU-UP, which comprises at least one of identities of the DUs, IP addresses of the DUs, and names of the DUs.

In an example, acquiring, by the CU-CP, the information of the DUs connected to the at least one CU-UP from the at least one CU-UP may comprise: receiving, by the CU-CP, an E1 setup request message from each of the at least one CU-UP, wherein the E1 setup request message comprises at least one of an identity of the CU-UP and a name of a CU-UP, and the E1 setup request message further comprises information of DUs connected to the CU-UP, which comprises at least one of identities of the DUs, IP addresses of the DUs, and names of the DUs; and transmitting, by the CU-CP, an E1 setup response message to the CU-UP, wherein the E1 setup response message comprises an identity of the CU-CP and a list of Tracking Areas TAs supported by the CU-CP.

In an example, the information of the DUs connected to the CU-UP may further comprise at least one of a load of the CU-UP, loads of transport layers between the DUs and the CU-UP, and information on whether interfaces between the DUs and the CU-UP are available.

According to yet another aspect of the embodiments of the present disclosure, there is provided a base station, including, a DU, a CU including a CU-CP and at least one CU-UP;

wherein the CU-CP is configured to acquire information of the at least one CU-UP connected to the DU; and select a CU-UP suitable for a UE's access from the at least one CU-UP, according to the acquired information of the at least one CU-UP connected to the DU.

According to a further aspect of the embodiments of the present disclosure, there is provided a base station, including, at least one DU, a CU including a CU-CP and CU-UPs, wherein the CU-CP is configured to acquire information of the at least one DU connected to the CU-UPs; and select a CU-UP suitable for a UE's access from the CU-UPs, according to the acquired information of the at least one DU connected to the CU-UPs.

According to the embodiments of the present disclosure, with the method for selecting a CU-UP implemented in a base station, failure of the UE's access may be avoided or trails for UE's access may be reduced, thereby improving the user experience.

DETAILED DESCRIPTION

In order to make the purposes, technical solutions and advantages of the present application more clear, the present application will be further described in detail below with reference to the accompanying drawings. It should be illustrated that the following description is for illustrative purposes only and is not intended to limit the present disclosure. In the following description, numerous specific details are set forth in order to provide a thorough understanding of the present disclosure. However, it will be apparent to those of ordinary skill in the art that it is not necessary to adopt these specific details to practice the present disclosure. In other instances, well-known circuits, materials, or methods have not been described in detail in order to avoid obscuring the present disclosure.

References to "one embodiment", "an embodiment", "one example" or "an example" throughout the specification are intended to mean that particular features, structures, or characteristics described in connection with the embodiment or example are included in at least one embodiment of the present disclosure. Therefore, phrases "in one embodiment", "in an embodiment", "one example" or "an example" appearing throughout the specification do not necessarily refer to the same embodiment or example. Further, the particular features, structures, or characteristics may be combined in one or more embodiments or examples in any suitable combination and/or sub-combination. In addition, it should be understood by those of ordinary skill in the art that the accompanying drawings are provided here for illustrative purposes, and the accompanying drawings are not necessarily drawn to scale. The term "and/or" used here comprises any and all combinations of one or more of associated listed items.

Figure 1:
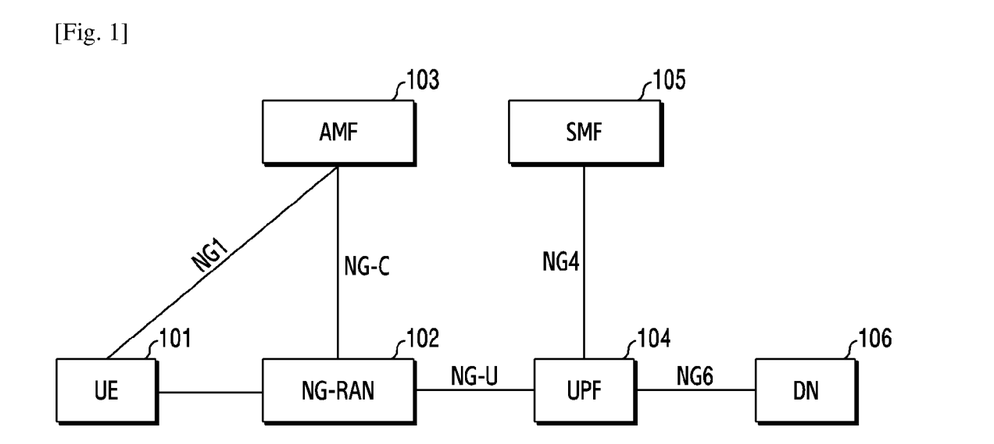
FIG. 1 illustrates an architectural diagram of a 5th generation (5G) system.

5G refers to the $5^{th}$ Generation (5G) mobile communication technology. FIG. 1 illustrates an exemplary system architecture diagram of a next generation network or a 5G network. As shown in FIG. 1, a user equipment (UE) 101 is a terminal device for receiving data. A next generation radio access network (NG-RAN) 102 is a radio access network, which comprises a 5G-node B (gNB) which provides a UE with access to a radio network interface or an eNodeB (eNB) which is connected to a 5G core network(5GC). An access control and mobility management function (AMF) 103 is responsible for managing a mobile context and security information of the UE. A user plane function (UPF) 104 mainly provides functions of a user plane. A session management function (SMF) 105 is responsible for session management. A data network (DN) 106 comprises services such as an operator's services, access to the Internet, and a third-party's services etc.

Figure 2:
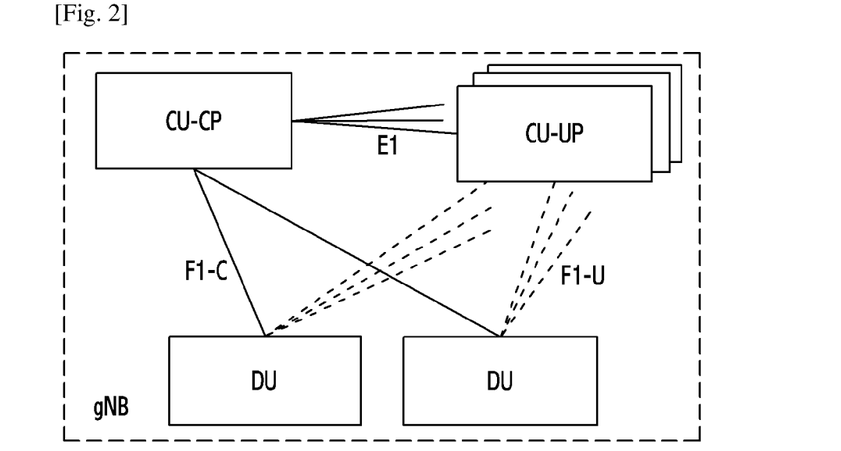
FIG. 2 illustrates a schematic block diagram of a 5G-node B (gNB)

FIG. 2 illustrates a schematic diagram of the gNB in the NG-RAN. As shown in FIG. 2, the gNB may further be divided into two entities, which are a distributed unit (DU) and a centralized unit (CU). The CU also may be referred as 'central unit'. The DU may comprise functions of radio link control (RLC), Media access control (MAC), and a physical layer. The CU comprises functions of a service data adaptive protocol (SDAP) and a packet data convergence protocol (PDCP). The CU may further be divided into two entities, which are a CU-control plane (CU-CP) and a CU-user plane (CU-UP). The CU-CP comprises functions of a control plane in the CU, and the CU-UP comprises functions of a user plane in the CU. One gNB may comprise one CU-CP, a plurality of CU-UPs, and a plurality of DUs. A CU-CP is connected to a DU through an F1-C interface. A CU-UP is connected to a DU through an F1-U interface. A CU-UP is connected to a CU-CP through an E1 interface. One DU may be connected to a plurality of CU-UPs under a control of the same CU-CP. One CU-UP may be connected to a plurality of DUs under a control of the same CU-CP.

In various embodiments, each of the CU, the CU-CP, the CU-UP and the DU may include at least one hardware component. For example, the at least one hardware component may include at least one of processor, a microprocessor, a controller, a transceiver, and so on.

According to the conventional technology, in a process of a UE's access, a DU receives a message from the UE, and transmits the message to a CU-CP, and the CU-CP selects a CU-UP which serves the UE. However, the CU-CP does not know a connection relationship between the DU and the CU-UP. If the CU-UP selected for serving the UE is not connected to the DU accessed by the UE, a call connection of the UE may fail, or the CU-CP needs to select another CU-UP for the UE's access, which may bring a longer access delay for the UE's access.

Figure 3:
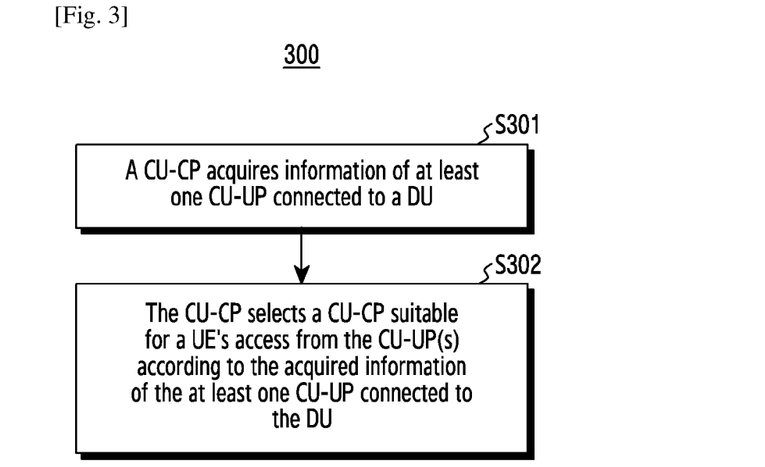
FIG. 3 illustrates a flowchart of a method for selecting a centralized unit-user plane (CU-UP) which may serve a user equipment (UE) according to an embodiment of the present disclosure.

According to an embodiment of the present disclosure, there is proposed a method for selecting a CU-UP. FIG. 3 illustrates a flowchart of a method for selecting a CU-UP implemented in a base station according to an embodiment of the present disclosure. As shown in FIG. 3, the method 300 comprises the following steps.

In step S301, a CU-CP in the base station acquires information of at least one CU-UP connected to a DU in the base station. In step S302, the CU-CP selects a CU-UP suitable for a UE's access from the at least one CU-UP according to the acquired information of the at least one CU-UP connected to the DU.

Figure 4:
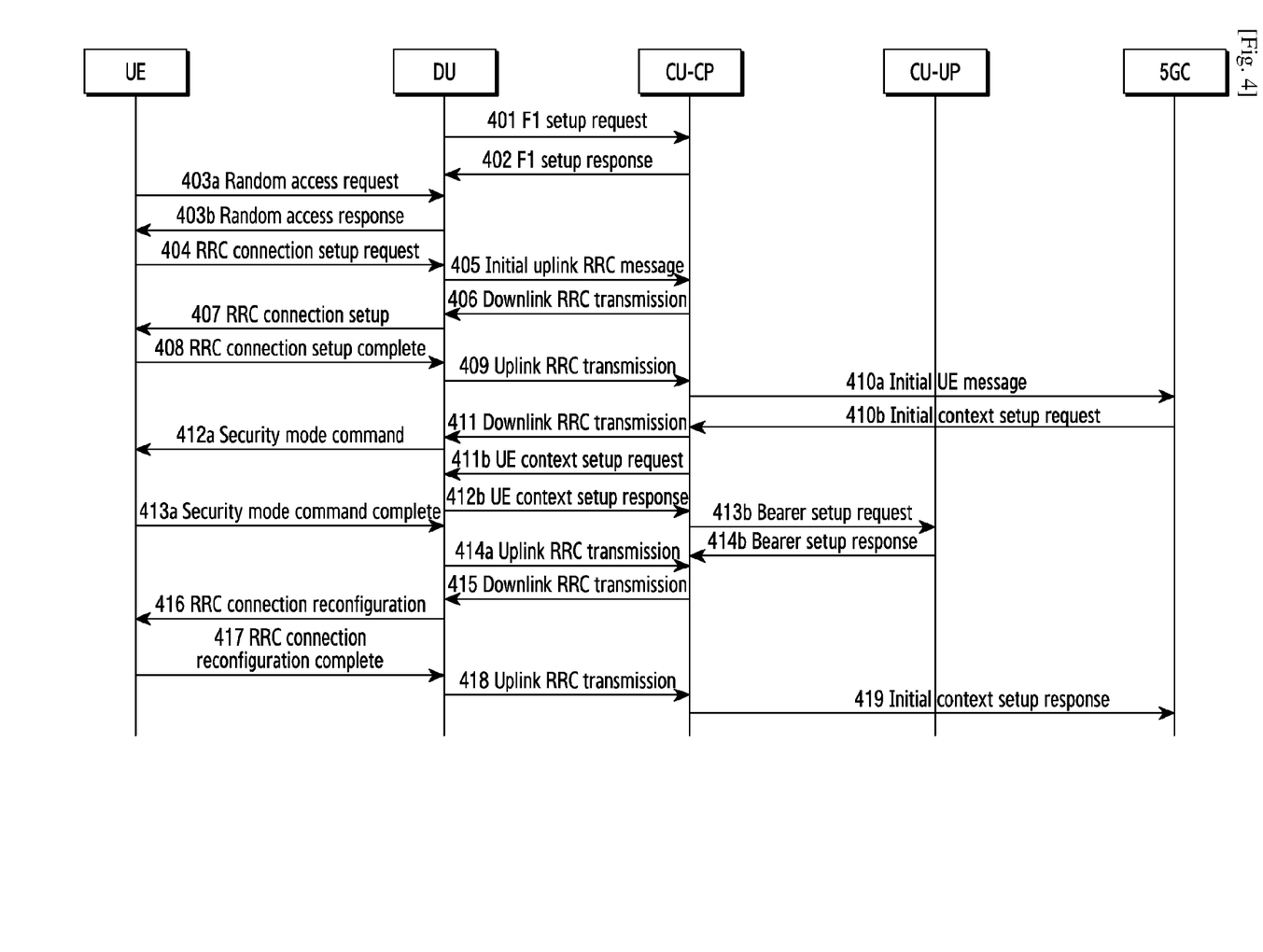
FIG. 4 illustrates a signaling flow diagram of an exemplary method according to an embodiment of the present disclosure.
Figure 5:
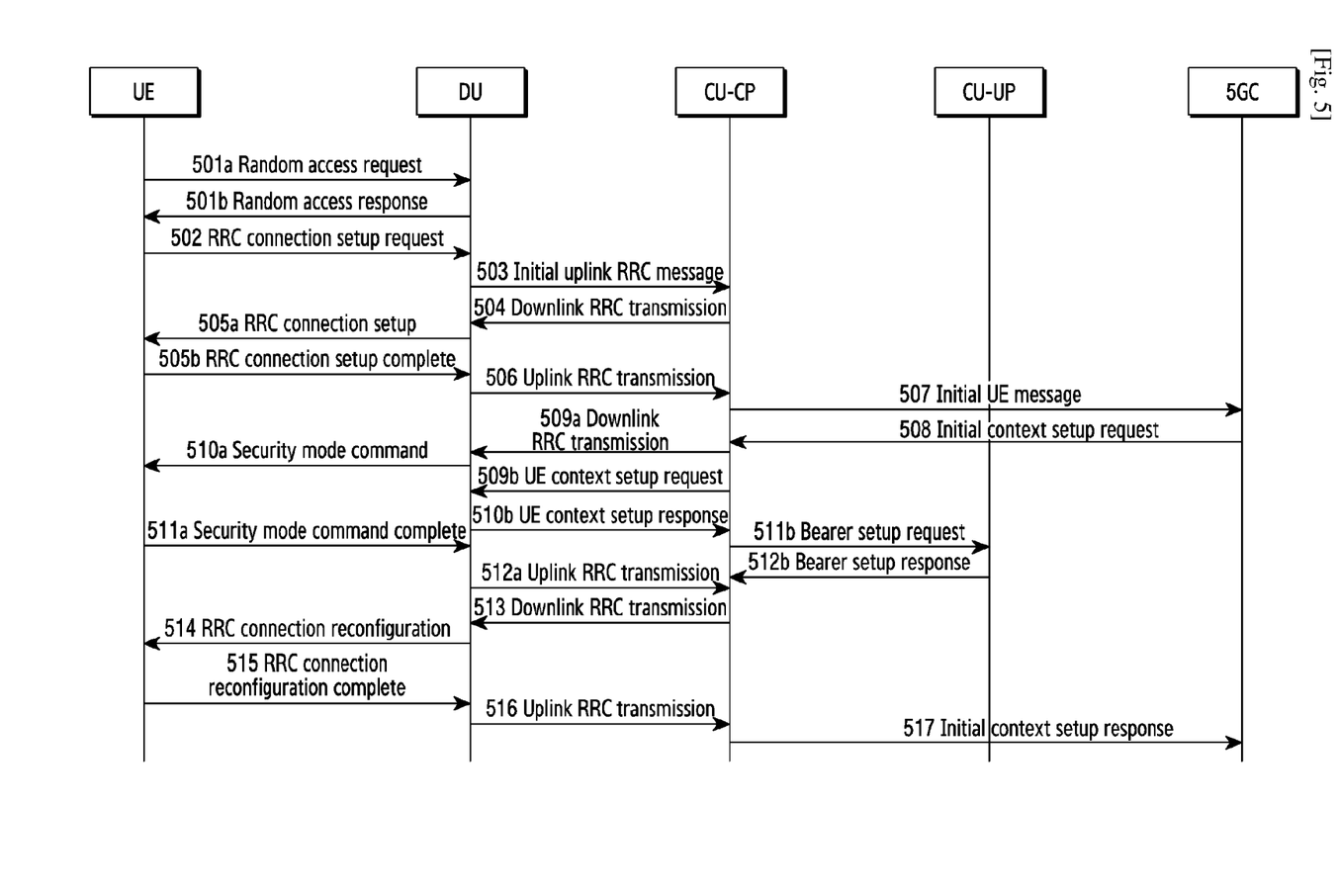
FIG. 5 illustrates a signaling flow diagram of another exemplary method according to an embodiment of the present disclosure.

FIG. 4 illustrates a signaling flow diagram of an exemplary method according to the embodiment described above, and FIG. 5 illustrates a signaling flow diagram of another exemplary method according to the embodiment described above. In the examples of FIGS. 4 and 5, the CU-CP acquires, from the DU, the information of the at least one CU-UP connected to the DU. The method according to the embodiment of the present disclosure will be described in detail below with reference to FIGS. 3 and 4 and FIGS. 3 and 5, respectively.

In the example of FIG. 4, the DU informs the CU-CP of the information of the at least one CU-UP connected to the DU, for example, through an F1 setup process, so that the CU-CP may select, for a UE, a CU-UP which serves the UE in a process of the UE's access through the DU. For the sake of brevity, a detailed description of conventional steps unrelated to the essence of the present disclosure is omitted below. In addition, it should be illustrated that serial numbers of various steps in the following method are only used as a representation of the steps for convenience of description, and should not be regarded as indicating an execution order of various steps. This method does not need to be performed exactly in an order as shown, unless explicitly stated.

As shown in FIG. 4, in step 401, the DU transmits an F1 setup request message to the CU-CP. The F1 setup request message comprises a list of information of the at least one CU-UP connected to the DU. The information of the at least one CU-UP connected to the DU comprises an identity of the at least one CU-UP, an Internet protocol (IP) address of the at least one CU-UP, and/or a name of the at least one CU-UP. The identity of the at least one CU-UP may also be information which may uniquely identify the at least one CU-UP under a control of other CU-CPs. The information of the at least one CU-UP connected to the DU further comprises a load of the at least one CU-UP or a load of a transport layer between the DU and the at least one CU-UP. The information of the at least one CU-UP connected to the DU further comprises information on whether an interface between the DU and the at least one CU-UP is available.

The CU-CP stores the received list of information of the at least one CU-UP connected to the DU.

In step 402, the CU-CP transmits an F1 setup response message to the DU.

When the at least one CU-UP connected to the DU changes, for example, when the DU is connected to a new CU-UP, the DU is disconnected from one or more of the at least one CU-UP, a load(s) between the DU and one or more of the at least one CU-UP change(s), a connection(s) between the DU and one or more of the at least one CU-UP fail(s), and/or a connection(s) between the DU and one or more of the at least one CU-UP recover(s), the DU transmits a gNB-DU configuration update message to the CU-CP, to transmit the updated list of information of the at least one CU-UP connected to the DU to the CU-CP. The DU may transmit, to the CU-CP, the updated list of information of the at least one CU-UP connected to the DU, or the changed list of information of the at least one CU-UP connected to the DU. The CU-CP stores the updated information received. The CU-CP transmits a gNB-DU configuration update acknowledgement message to the DU.

Steps 403-419 provide an example in which the CU-CP selects a suitable CU-UP for the accessed UE using the list of information of the at least one CU-UP connected to the DU which is received from the DU in the F1 setup process.

In step 403, a random access process of the UE is performed.

In step 404, the UE transmits a radio resource control (RRC) connection setup request message. The message comprises at least a temporary identity of the UE.

In step 405, the DU forwards the RRC message from the UE to the CU-CP through an F1 access protocol (AP) initial uplink RRC message of a transfer message. The F1 AP message further comprises an identity of an F1 AP UE, a cell radio network temporary identity (C-RNTI), and a low layer configuration.

In step 406, the CU-CP generates an RRC connection setup message and transmits the RRC connection setup message to the DU through downlink RRC transmission of the F1 AP message. The F1 AP message further comprises the identity of the F1 AP UE. Only when the CU-CP accepts the UE's access, the CU-CP generates an RRC connection setup message and transmits the RRC connection setup message to the DU.

In step 407, the DU transmits the RRC connection setup message to the UE. In step 408, the DU receives an RRC connection setup complete message from the UE.

In step 409, the DU forwards the RRC message from the UE to the CU-CP. The RRC message may comprise non-access stratum (NAS) information, information related to selection of a Core Network (CN) node, slice information, etc.

In step 410, the CU-CP transmits an initial UE message to a 5GC. The 5GC transmits an initial context setup request message to a RAN. In architecture in which a CP is separated or isolated from an UP, the RAN node here is a CU-CP. In a case where the 5GC decides to set up a UE context, the 5GC transmits an initial context setup request message to the RAN.

In step 411, the RAN receives the UE context information. The RAN may trigger some processes, some of which may occur in parallel.

The above steps 411a, 412a, 413a, and 414a are equivalent to a security mode command process, which is used to trigger setup of security of the UE. Subsequent wireless signaling and data will be encrypted and the signaling may be fully protected. These steps may be performed in parallel with steps 411b, 412b, 413b, and 414b.

Resources may be set up for the UE in the DU and a CU-UP through steps 411b, 412b, 413b, and 414b. The CU-CP selects a CU-UP which serves the UE. The CU-CP selects, for the UE, the CU-UP which serves the UE according to the information of the at least one CU-UP connected to the DU which is received by the CU-CP from the DU in step 401. For example, the CU-CP may select the CU-UP in consideration of availability and/or load conditions of the at least one CU-UP connected to the DU which is accessed by the UE. If the CU-UP allocates an uplink (UL) tunnel end identity (TEID) between the DU and the CU-UP, the CU-CP may interact with the at least one CU-UP to obtain one or more UL TEIDs allocated by the at least one CU-UP to the UE before step 411b.

In step 411b, the CU-CP transmits a UE context setup request message to the DU. The message comprises UE context information. The UE context information comprises radio access capabilities of the UE, a Data Radio Bearer (DRB) of the UE, UL TEIDs, and Quality of service (Qos) related information. The DU allocates resources to the UE using the UE context setup request message.

In step 412b, the DU transmits a UE context setup response message to the CU-CP. The message comprises low layer configuration information of the DRB.

In step 413b, the CU-CP transmits a bearer setup message to the CU-UP selected for the UE.

In step 414b, the CU-UP transmits a bearer setup response message to the CU-CP.

In step 415, the CU-CP generates an RRC connection reconfiguration message and transmits the RRC connection reconfiguration message to the DU. This step may be performed before steps 414a and 414b.

In step 416, the DU transmits an RRC connection reconfiguration message to the UE.

In step 417, the DU receives an RRC connection reconfiguration complete message from the UE.

In step 418, the DU transmits the received RRC message to the CU-CP through transmission of an uplink RRC message of the F1 AP message.

In step 419, the CU-CP transmits an initial context setup response message to the 5GC. The CU-CP transmits a downlink GTP TEID to the 5GC. The downlink GTP TEID is allocated by the CU-CP or the CU-UP for data transmission between a core network and the CU-UP.

According to the embodiment described above, in the architecture in which the CP is separated from the UP, the CU-CP may select a suitable CU-UP for the UE, to ensure UE's successful access and a low delay, thereby improving the user experience. In particular, the CU-CP may be avoided from selecting, for the UE, a CU-UP which is not connected to the DU accessed by the UE or a CU-UP which is overloaded.

In the example of FIG. 5, the DU informs the CU-CP of the information of the at least one CU-UP connected to the DU or information of the at least one CU-UP selectable for the UE through a UE-specific message, so that the CU-CP may select, for the UE, a CU-UP which serves the UE. A detailed description of conventional steps unrelated to the essence of the present disclosure is omitted below. In addition, it should be illustrated that serial numbers of various steps in the following method are only used as a representation of the steps for convenience of description, and should not be regarded as indicating an execution order of various steps. This method does not need to be performed exactly in an order as shown, unless explicitly stated.

As shown in FIG. 5, in step 501, a random access process of the UE is performed.

In step 502, the UE transmits an RRC connection setup request message. The message comprises at least a temporary identity of the UE.

In step 503, the DU forwards the RRC message from the UE to the CU-CP through an F1 AP initial uplink RRC message of a transfer message. The F1 AP message further comprises an identity of an F1 AP UE, a C-RNTI, and a low layer configuration. The F1 AP message comprises a list of information of the at least one CU-UP connected to the DU or a list of information of the CU-UPs selectable for the UE. The information of the at least one CU-UP connected to the DU or the information of the at least one CU-UP selectable for the UE comprises an identity of the at least one CU-UP, an IP address of the at least one CU-UP, and/or a name of the at least one CU-UP. The identity of the at least one CU-UP may also be information which may uniquely identify the at least one CU-UP under a control of other CU-CPs. The information of the at least one CU-UP connected to the DU or the information of the at least one CU-UP selectable for the UE further comprises a load of the at least one CU-UP or a load of a transport layer between the DU and the at least one CU-UP.

The CU-CP stores the received list of information of the at least one CU-UP connected to the DU or the received list of information of the CU-UPs selectable for the UE.

In step 504, the CU-CP generates an RRC connection setup message and transmits the RRC connection setup message to the DU through downlink RRC transmission of the F1 AP message. The F1 AP message further comprises the identity of the F1 AP UE. Only when the CU-CP accepts the UE's access, the CU-CP generates an RRC connection setup message and transmits the RRC connection setup message to the DU.

In step 505, the DU transmits the RRC connection setup message to the UE. The DU receives an RRC connection setup complete message from the UE.

In step 506, the DU forwards the RRC message from the UE to the CU-CP. The DU transmits the RRC connection setup complete message to the CU-CP through uplink RRC transmission of the F1 AP message. The RRC message may comprise NAS information, information related to selection of a CN node, slice information, etc. According to an embodiment of the present disclosure, the list of information of the at least one CU-UP connected to the DU or the list of information of the at least one CU-UP selectable for the UE may also be transmitted to the CU-CP in this step. The F1

AP message comprises the list of information of the at least one CU-UP connected to the DU or the list of information of the at least one CU-UP selectable for the UE. The information of the at least one CU-UP connected to the DU or the information of the at least one CU-UP selectable for the UE comprises an identity of the at least one CU-UP, an IP address of the at least one CU-UP, and/or a name of the at least one CU-UP. The identity of the at least one CU-UP may also be information which may uniquely identify the at least one CU-UP under a control of other CU-CPs. The information of the at least one CU-UP connected to the DU or the information of the at least one CU-UP selectable for the UE further comprises a load of the at least one CU-UP or a load of a transport layer between the DU and the at least one CU-UP.

The CU-CP stores the received list of information of the at least one CU-UP connected to the DU or the received list of information of the CU-UPs selectable for the UE.

In step 507, the CU-CP transmits an initial UE message to a 5GC.

In step 508, the 5GC transmits an initial context setup request message to a RAN. In architecture in which a CP is separated or isolated from an UP, the RAN node here is a CU-CP. In a case where the 5GC decides to set up a UE context, the 5GC transmits an initial context setup request message to the RAN.

In step 509, the RAN receives the UE context information. The RAN may trigger some processes, some of which may occur in parallel.

Steps 509a, 510a, 511a, and 512a are equivalent to a security mode command process, which is used to trigger setup of security of the UE. Subsequent wireless signaling and data will be encrypted and the signaling may be fully protected. These steps may be performed in parallel with steps 509b, 510b, 511b, and 512b.

Resources may be set up for the UE in the DU and a CU-UP through steps 509b, 510b, 511b, and 512b. The CU-CP selects a CU-UP which serves the UE. The CU-CP selects, for the UE, the CU-UP which serves the UE according to the list of information of the at least one CU-UP connected to the DU or the list of information of the at least one CU-UP selectable for the UE which is received by the CU-CP from the DU in step 503 or 506. For example, the CU-CP may select the CU-UP according to availability and/or load conditions of the at least one CU-UP connected to the DU which is accessed by the UE. If the CU-UP allocates an UL TED between the DU and the CU-UP, the CU-CP needs to interact with the at least one CU-UP to obtain one or more UL TEIDs allocated by the at least one CU-UP to the UE before step 509b.

In step 509b, the CU-CP transmits a UE context setup request message to the DU. The message comprises UE context information. The UE context information comprises radio access capabilities of the UE, a Data Radio Bearer (DRB) of the UE, UL TEIDs, and Quality of service (Qos) related information. The DU allocates resources to the UE.

In step 510b, the DU transmits a UE context setup response message to the CU-CP. The message comprises low layer configuration information of the DRB.

In step 511b, the CU-CP transmits a bearer setup message to the CU-UP selected for the UE.

In step 512b, the CU-UP transmits a bearer setup response message to the CU-CP.

Steps 513-517 in FIG. 5 are the same as steps 415-419 in FIG. 4, and details thereof will not be described here.

According to the embodiment described above, in the architecture in which the CP is separated from the UP, the CU-CP may select a suitable CU-UP for the UE, to ensure UE's successful access and a low delay, thereby improving the user experience. In particular, the CU-CP may be avoided from selecting, for the UE, a CU-UP which is not connected to the DU accessed by the UE or a CU-UP which is overloaded.

Figure 6:
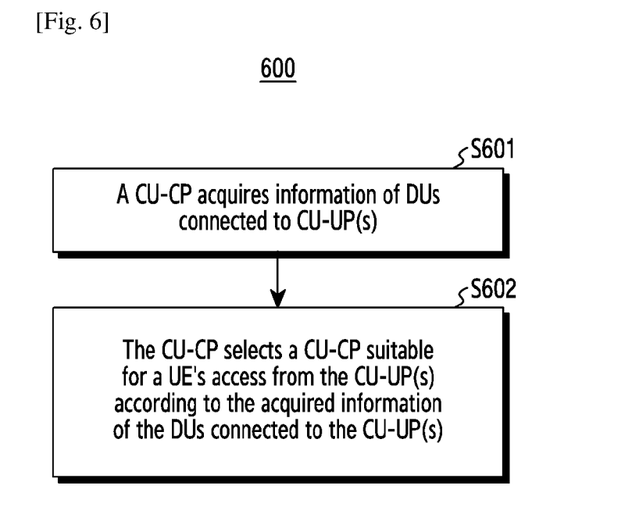
FIG. 6 illustrates a flowchart of a method for selecting a CU-UP which may serve a UE according to another embodiment of the present disclosure.

FIG. 6 illustrates a flowchart of a method for selecting a CU-UP according to another embodiment of the present disclosure. As shown in FIG. 6, the method 600 comprises the following steps.

In step S601, a CU-CP in a base station acquires information of DUs connected to at least one CU-UP.

In step S602, the CU-CP selects a CU-UP suitable for a UE' access from the at least one CU-UP according to the acquired information of the DUs connected to the at least one CU-UP.

Figure 7:
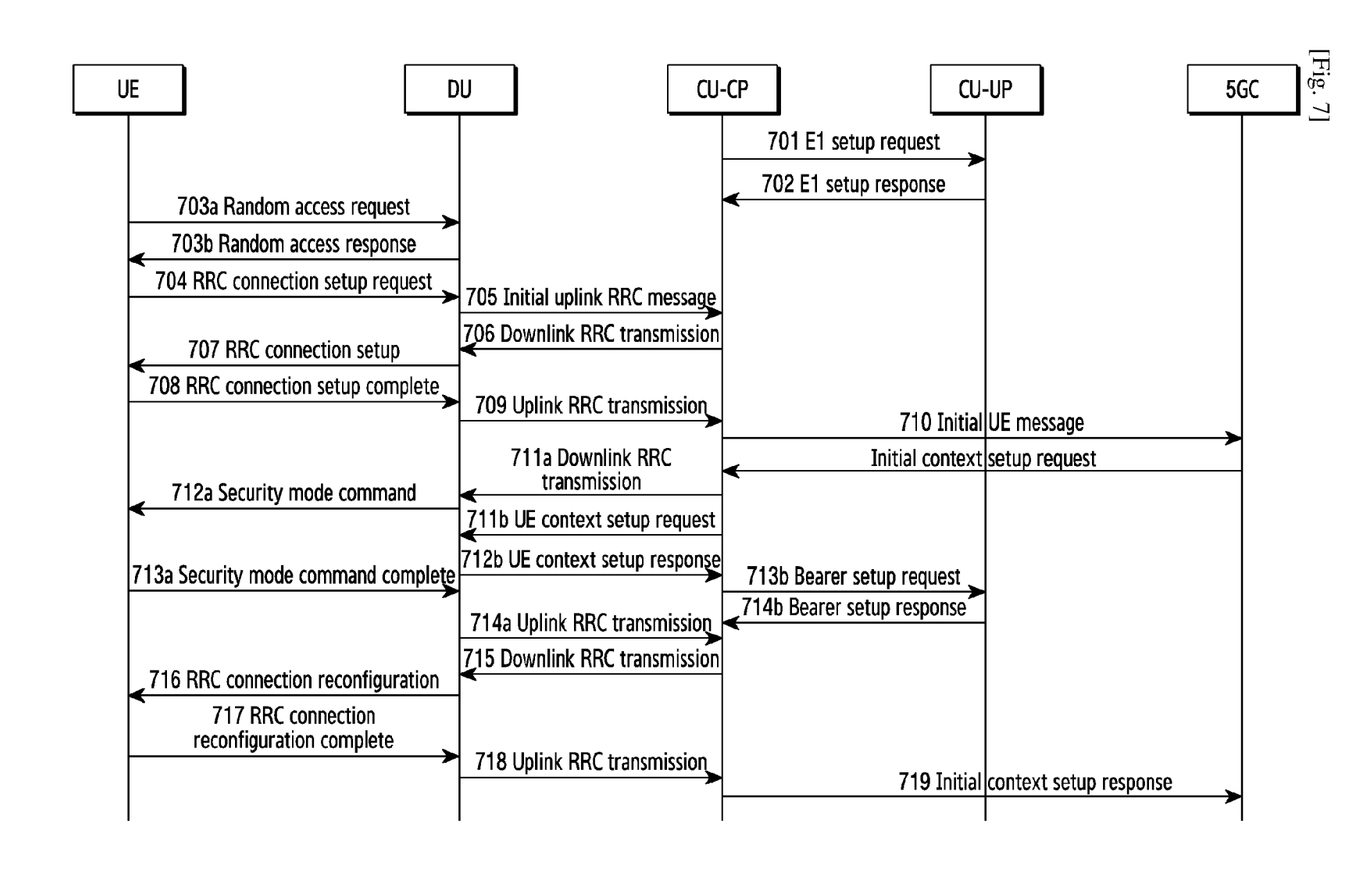
FIG. 7 illustrates a signaling flow diagram of an exemplary method according to another embodiment of the present disclosure.

FIG. 7 illustrates a signaling flow diagram of an exemplary method according to the embodiment described above, and FIG. 8 illustrates a signaling flow diagram of another exemplary method according to the embodiment described above. In the examples of FIGS. 7 and 9, the CU-CP acquires information of DUs connected to the at least one CU-UP from the at least one CU-UP. The method according to the embodiment of the present disclosure will be described in detail below with reference to FIGS. 6 and 7 and FIGS. 6 and 8, respectively.

In the example of FIG. 7, each of the at least one CU-UP informs the CU-CP of the information of the DUs connected to the CU-UP through, for example, an E1 setup process triggered by the CU-CP, so that the CU-CP may select, for the UE, a CU-UP which serves the UE in a process of the UE's access through the DUs. For the sake of brevity, a detailed description of conventional steps unrelated to the essence of the present disclosure is omitted below. In addition, it should be illustrated that serial numbers of various steps in the following method are only used as a representation of the steps for convenience of description, and should not be regarded as indicating an execution order of various steps. This method does not need to be performed exactly in an order as shown, unless explicitly stated.

As shown in FIG. 7, in step 701, the CU-CP transmits an E1 setup request message to the CU-UP. The message comprises an identity of the CU-CP and/or a list of Tracking Areas (TAs) supported by the CU-CP.

In step 702, the CU-UP transmits an E1 setup response message to the CU-CP. The E1 setup response message comprises an identity of the CU-UP, and/or a list of TAs supported by the CU-UP. The message comprises a list of information of DUs connected to the CU-UP. The information of the DU connected to the CU-UP comprises an identity of the DU, an IP address of the DU, and/or a name of the DU. The identity of the DU may also be information which may uniquely identify the DU under a control of other CU-CPs. The information of the DU connected to the CU-UP further comprises a load of a transport layer between the DU and the CU-UP. The information of the DU connected to the CU-UP further comprises information on whether an interface between the DU and the CU-UP is available. The E1 setup response message further comprises a load of the CU-UP.

The CU-CP stores the received information, including the received list of information of the DUs connected to the CU-UP. The CU-CP stores the received information of the load of the CU-UP.

When the DUs connected to the CU-UP change, for example, when the CU-UP is connected to a new DU, the CU-UP is disconnected from one or more of the DUs, and a load(s) between the CU-UP and one or more of the DUs change(s), a connection(s) between the CU-UP and one or more of the DUs fail(s), and/or a connection(s) between the CU-UP and one or more of the DUs recover(s), the CU-UP transmits a CU-UP configuration update message to the CU-CP, to transmit the updated list of information of the DUs connected to the CU-UP to the CU-CP. The CU-UP may transmit, to the CU-CP, the updated list of information of the DUs connected to the CU-UP, or the changed list of information of the DUs connected to the CU-UP. When the load of the CU-UP changes, the CU-UP may also transmit a CU-UP configuration update message to the CU-CP, to transmit the updated load of the CU-UP to the CU-CP. The CU-CP stores the updated information received. The CU-CP transmits a CU-UP configuration update acknowledgement message to the CU-UP.

This is merely a description of the E1 setup process between one CU-UP and the CU-CP. In fact, the CU-CP needs to set up an E1 connection with all the CU-UPs under its control. A specific E1 setup process is the same as that in the steps 701 and 702 described above, and details thereof will not be described here again. In this way, the CU-CP knows a connectivity status between the at least one CU-UP under its control and the DUs under its control.

How the CU-CP selects a suitable CU-UP for the accessed UE using the list of information of the DUs connected to the at least one CU-UP which is received from the at least one CU-UP in the E1 setup process will be described in steps 703-719.

Steps 703-711a in FIG. 7 are the same as steps 403-411a in FIG. 4, and details thereof will not be described here again.

Resources are set up for the UE in the DU and the at least one CU-UP through steps 711b, 712b, 713b, and 714b. The CU-CP selects a CU-UP which serves the UE. The CU-CP selects, for the UE, the CU-UP which serves the UE according to the information of the DUs connected to the at least one CU-UP which is received by the CU-CP from the at least one CU-UP in step 702. The CU-CP selects a CU-UP connected to a DU accessed by the UE to serve the UE. For example, the CU-CP may select the CU-UP in consideration of availability and/or load conditions of the CU-UPs connected to the DU accessed by the UE. If the CU-UP allocates an UL TEID between the DU and the CU-UP, the CU-CP needs to interact with the CU-UP to obtain one or more UL TEIDs allocated by the CU-UP to the UE before step 711b.

Specific methods of steps 711b, 712b, 713b, and 714b in FIG. 7 are the same as those of steps 411b, 412b, 413b, and 414b in FIG. 4, and details thereof will not be described here again.

Steps 715-719 in FIG. 7 are the same as steps 415-419 in FIG. 4, and details thereof will not be described here again.

According to the embodiment of the present disclosure, in the architecture in which the CP is separated from the UP, the CU-CP may select a suitable CU-UP for the UE, to ensure the UE's successful access and a low delay, thereby improving the user experience. In particular, the CU-CP may be avoided from selecting, for the UE, a CU-UP which is not connected to the DU accessed by the UE or a CU-UP which is overloaded.

Figure 8:
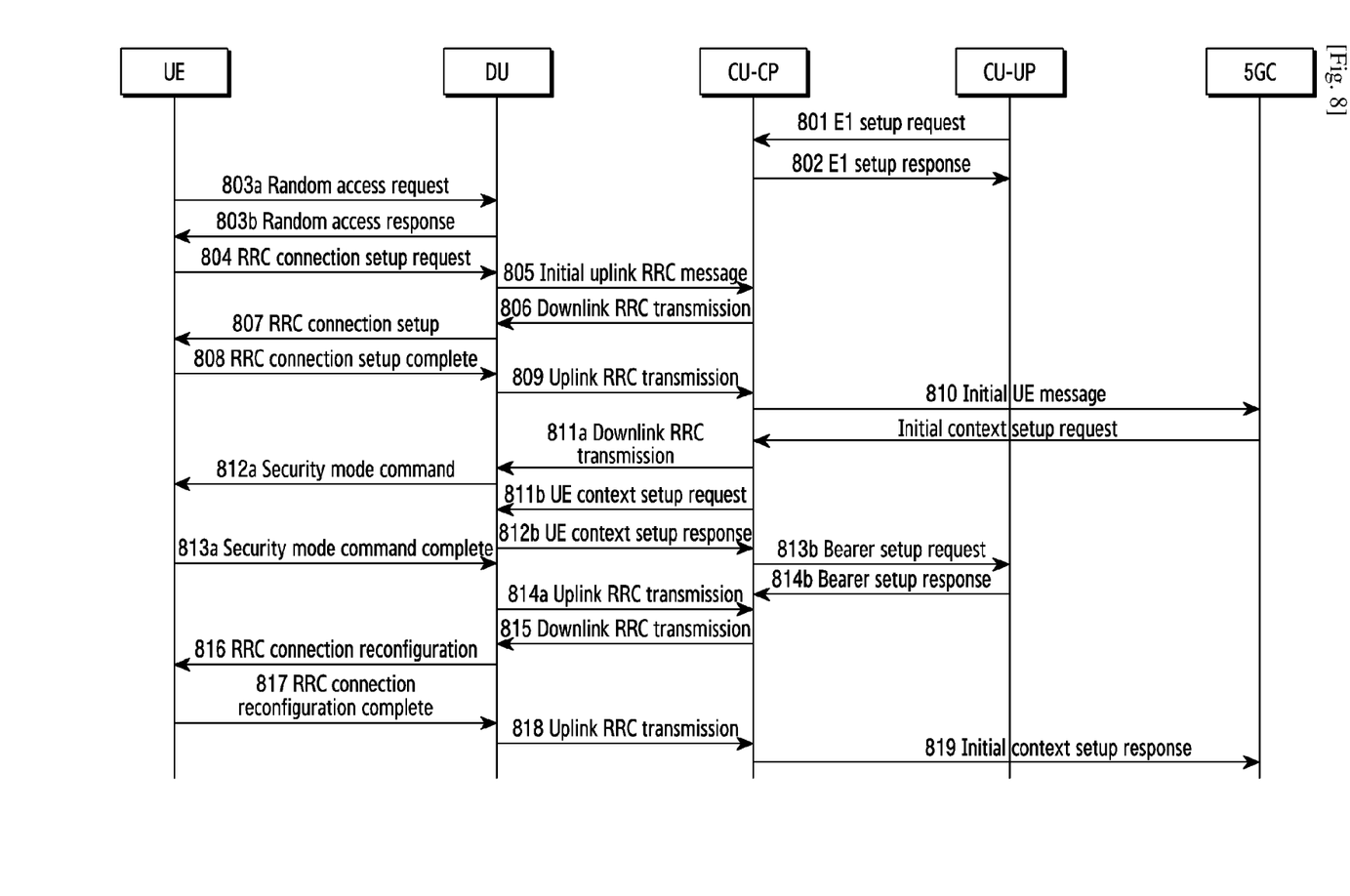
FIG. 8 illustrates a signaling flow diagram of another exemplary method according to another embodiment of the present disclosure.
Figure 9:
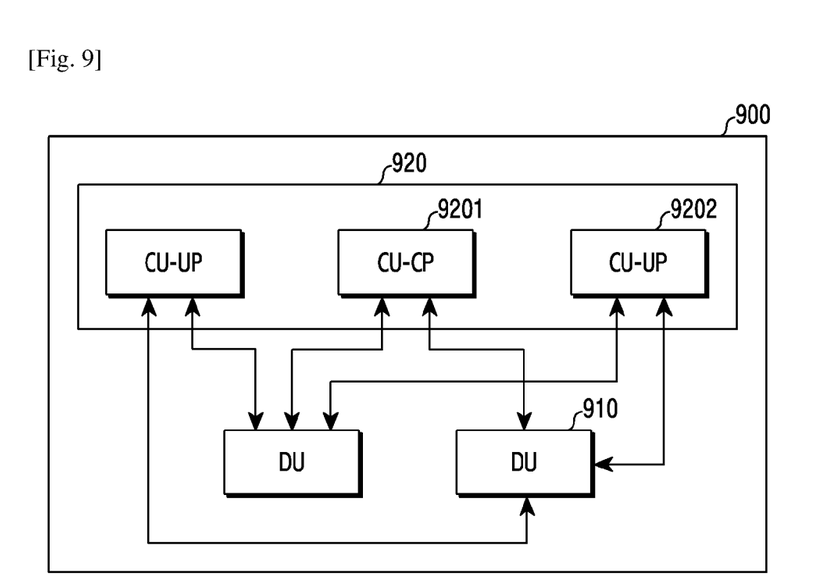
FIG. 9 illustrates a schematic block diagram of a base station according to an embodiment of the present application.

In the example of FIG. 8, each of the at least one CU-UP informs the CU-CP of the information of the DUs connected to the CU-UP through, for example, an E1 setup process triggered by the CU-UP, so that the CU-CP may select, for the UE, a CU-UP which serves the UE in a process of the UE's access through the DUs. For the sake of brevity, a detailed description of steps unrelated to the present disclosure is omitted here.

As shown in FIG. 8, in step 801, the CU-UP transmits an E1 setup request message to the CU-CP. The E1 setup request message comprises an identity of the CU-UP, and/or a name of the CU-UP. The E1 setup request message comprises a list of information of DUs connected to the CU-UP. The information of the DU connected to the CU-UP comprises an identity of the DU, an IP address of the DU, and/or a name of the DU. The identity of the DU may also be information which may uniquely identify the DU under a control of other CU-CPs. The information of the DU connected to the CU-UP further comprises a load of a transport layer between the DU and the CU-UP. The information of the DU connected to the CU-UP further comprises information on whether an interface between the DU and the CU-UP is available. The E1 setup request message further comprises a load of the CU-UP.

The CU-CP stores the received information, including the list of information of the DUs connected to the CU-UP. The CU-CP stores the received information of the load of the CU-UP.

In step 802, the CU-CP transmits an E1 setup response message to the CU-UP. The message comprises an identity of the CU-CP and/or a list of TAs supported by the CU-CP.

When the DUs connected to the CU-UP change, for example, when the CU-UP is connected to a new DU, the CU-UP is disconnected from one or more of the DUs, and a load(s) between the CU-UP and one or more of the DUs change(s), a connection(s) between the CU-UP and one or more of the DUs fail(s), and/or a connection(s) between the CU-UP and one or more of the DUs recover(s), the CU-UP transmits a CU-UP configuration update message to the CU-CP, to transmit the updated list of information of the DUs connected to the CU-UP to the CU-CP. The CU-UP may transmit, to the CU-CP, the updated list of information of the DUs connected to the CU-UP, or the changed list of information of the DUs connected to the CU-UP. When the load of the CU-UP changes, the CU-UP may also transmit a CU-UP configuration update message to the CU-CP, to transmit the updated load of the CU-UP to the CU-CP. The CU-CP stores the updated information received. The CU-CP transmits a CU-UP configuration update acknowledgement message to the CU-UP.

This is merely a description of the E1 setup process between one CU-UP and the CU-CP. In fact, the CU-CP needs to set up an E1 connection with all the CU-UPs under its control. A specific E1 setup process is the same as that in the steps 801 and 802 described above, and details thereof will not be described here again. In this way, the CU-CP knows connection conditions between the at least one CU-UP under its control and the DUs under its control.

An example in which the CU-CP selects a suitable CU-UP for the accessed UE using the list of information of the DUs connected to the at least one CU-UP which is received from the at least one CU-UP in the E1 setup process will be described in steps 803-819.

Steps 803-811a in FIG. 8 may be the same as steps 403-411a in FIG. 4, and details thereof will not be described here again.

Resources are set up for the UE in the DU and the at least one CU-UP through steps 811b, 812b, 813b, and 814b. The CU-CP selects a CU-UP which serves the UE. The CU-CP selects, for the UE, the CU-UP which serves the UE according to the information of the DUs connected to the at least one CU-UP which is received by the CU-CP from the at least one CU-UP in step 801. The CU-CP selects a CU-UP connected to a DU accessed by the UE to serve the UE. For example, the CU-CP may select the CU-UP in consideration of availability and/or load conditions of the at least one CU-UP connected to the DU accessed by the UE. If the CU-UP allocates an UL TED between the DU and the CU-UP, the CU-CP needs to interact with the CU-UP to obtain one or more UL TEIDs allocated by the CU-UP to the UE before step 811*b*.

Specific methods of steps 811*b*, 812*b*, 813*b*, and 814*b* in FIG. 8 may be the same as those of steps 411*b*, 412*b*, 413*b*, and 414*b* in FIG. 4, and details thereof will not be described here again.

Steps 815-819 in FIG. 8 may be the same as steps 415-419 in FIG. 4, and details thereof will not be described here again.

According to the embodiment described above, in the architecture in which the CP is separated from the UP, the CU-CP may select a suitable CU-UP for the UE, to ensure the UE's successful access and a low delay, thereby improving the user experience. In particular, the CU-CP may be avoided from selecting, for the UE, a CU-UP which is not connected to the DU accessed by the UE or a CU-UP which is overloaded.

According to another aspect of the present disclosure, there is further provided a base station. FIG. 9 schematically illustrates a block diagram of a base station 900 according to an embodiment of the present disclosure. As shown in FIG. 9, the base station 900 may comprise DUs 910 and a CU 920, wherein the CU 920 comprises a CU-CP 9201 and CU-UPs 9202. The CU-CP 9201 is configured to acquire information of at least one CU-UP connected to the DUs 910; and select, from the at least one CU-UP, a CU-UP suitable for a UE's access according to the acquired information of the at least one CU-UP connected to the DUs.

Although the exemplary base station 900 of FIG. 9 comprises two CU-UPs and two DUs, it may be understood by those skilled in the art that the base station according to the embodiment of the present disclosure may comprise other numbers of at least one CU-UP and other numbers of DUs, and the present disclosure is not limited thereto.

According to an embodiment of the present disclosure, the CU-CP may acquire the information of the at least one CU-UP connected to each of the DUs from the DU.

For example, the CU-CP is configured to receive an F1 setup request message from the DU, wherein the F1 setup request message comprises information of the at least one CU-UP connected to the DU, which comprises at least one of an identity(identities) of the at least one CU-UP, an IP address of the at least one CU-UP, and a name of the at least one CU-UP. For example, the information of the at least one CU-UP connected to the DU further comprises at least one of a load of the at least one CU-UP, a load of a transport layer between the DU and the at least one CU-UP, and information on whether an interface between the DU and the at least one CU-UP is available.

According to an embodiment of the present disclosure, the CU-CP may be configured to receive an F1 AP message from the DU, wherein the F1 AP message comprises information of the at least one CU-UP connected to the DU or information of the at least one CU-UP selectable for the UE, which comprises at least one of an identity(identities) of the CU-UP, an IP address of the at least one CU-UP, and a name of the at least one CU-UP. The information of the at least one CU-UP connected to the DU or the information of the at least one CU-UP selectable for the UE further comprises at least one of a load of the at least one CU-UP, and a load of a transport layer between the DU and the at least one CU-UP.

Figure 10:
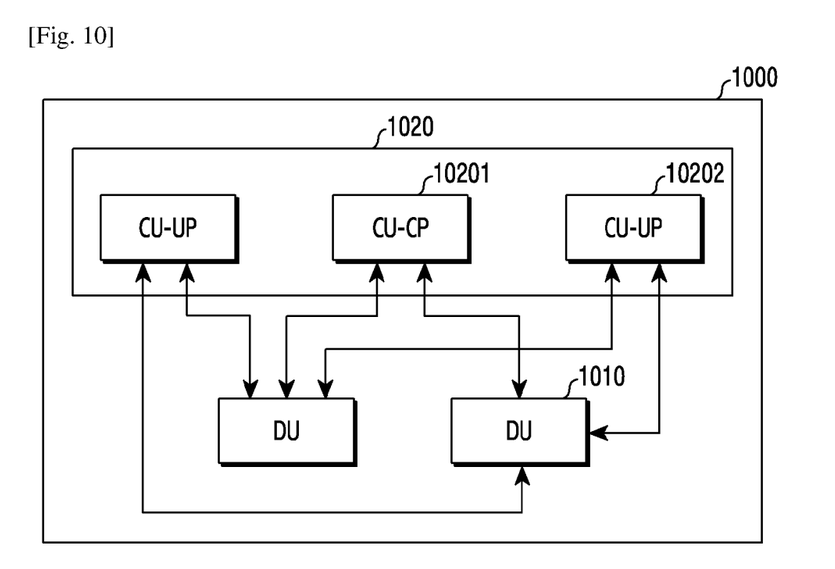
FIG. 10 illustrates a schematic block diagram of another base station according to an embodiment of the present application.

According to another aspect of the present disclosure, there is further provided a base station. FIG. 10 schematically illustrates a block diagram of a base station 1000 according to an embodiment of the present disclosure. As shown in FIG. 10, the base station 1000 may comprise DUs 1010 and a CU 1020, wherein the CU 1020 comprises a CU-CP 10201 and CU-UPs 10202. The CU-CP 10201 is configured to acquire information of DUs connected to the CU-UPs; and select, from the CU-UPs, a CU-UP suitable for a UE's access according to the acquired information of the DUs connected to the CU-UPs.

Although the exemplary base station 1000 of FIG. 10 comprises two CU-UPs and two DUs, it may be understood by those skilled in the art that the base station according to the embodiment of the present disclosure may comprise other numbers of at least one CU-UP and other numbers of DUs, and the present disclosure is not limited thereto.

According to an embodiment of the present disclosure, the CU-CP may acquire the information of the DUs connected to the at least one CU-UP from the at least one CU-UP.

For example, the CU-CP may be configured to transmit an E1 setup request message to each of the at least one CU-UP, wherein the E1 setup request message comprises an identity of the CU-CP and a list of TAs supported by the CU-CP; and receive an E1 setup response message from the CU-UP, wherein the E1 setup response message comprises an identity of the CU-UP and a list of TAs supported by the CU-UP, and the E1 setup response message further comprises information of DUs connected to the CU-UP, which comprises at least one of identities of the DUs, IP addresses of the DUs, and names of the DUs.

For example, the CU-CP may further be configured to receive an E1 setup request message from the CU-UP, wherein the E1 setup request message comprises at least one of an identity of the CU-UP and a name of the CU-UP, and the E1 setup request message further comprises information of DUs connected to the CU-UP, which comprises at least one of identities of the DUs, IP addresses of the DUs, and names of the DUs; and transmit an E1 setup response message to the CU-UP, wherein the E1 setup response message comprises an identity of the CU-CP and a list of TAs supported by the CU-CP. For example, the information of the DUs connected to the CU-UP further comprises at least one of a load of the CU-UP, loads of transport layers of the CU-UP and the DUs, and information on whether interfaces between the CU-UP and the DUs are available.

It may be understood by those skilled in the art that the embodiments of the present application comprise devices related to performing one or more of the operations described in the present application. These devices may be specially designed and manufactured for the required purposes, or may also comprise known devices in a general purpose computer. These devices have computer programs stored therein which are selectively activated or reconfigured. Such computer programs may be stored in a device (for example, computer) readable medium or in any types of media suitable for storing electronic instructions and respectively coupled to a bus, including, but not limited to, any types of disks (including a floppy disk, a hard disk, an optical disk, a Compact Disc-Read-Only Memory (CD-ROM), and a magneto-optical disk), a Read-Only Memory (ROM), a Random access Memory (RAM), an Erasable Programmable Read-Only Memory (EPROM), an Electrically Erasable Programmable Read-Only Memory (EE- PROM), a flash memory, a magnetic card or a light card. That is, the readable medium comprises any medium which is used by a device (for example, a computer) to store or transmit information in a readable form.

It may be understood by those skilled in the art that each block of the structural diagrams and/or block diagrams and/or flow diagrams and combinations thereof may be implemented by computer program instructions. It may be understood by those skilled in the art that these computer program instructions may be implemented by a general purpose computer, a professional computer, or a processor of other programmable data processing methods, so that solutions specified in one or more blocks of the structural diagrams and/or block diagrams and/or flow diagrams disclosed in the present disclosure are executed by the computer or the processor of other programmable data processing methods.

It may be understood by those skilled in the art that steps, measures, and solutions in various operations, methods, and flows which have been discussed in the present disclosure may be alternated, modified, combined, or deleted. Further, other steps, measures, and solutions in various operations, methods, and flows which have been discussed in the present disclosure may be alternated, modified, rearranged, decomposed, combined, or deleted. Further, steps, measures, and solutions in various operations, methods, and flows which are in the related art and have been discussed in the present disclosure may be alternated, modified, rearranged, decomposed, combined, or deleted.

The above description is merely some embodiments of the present disclosure, and it should be illustrated that those of ordinary skill in the art can also make several improvements and retouches without departing from the principles of the present application. These improvements and retouches should be considered to fall within the protection scope of the present disclosure.

The invention claimed is:

1. A method performed by a centralized unit-control plane (CU-CP) in a mobile communication system, the method comprising:
    acquiring, by the CU-CP in a base station from a distributed unit (DU), information regarding at least one centralized unit-user plane (CU-UP) connected to the distributed unit (DU), wherein the information regarding the at least one CU-UP connected to the DU comprises information on whether an interface between the at least one CU-UP and the DU is available; and
    selecting, by the CU-CP, a CU-UP among the at least one CU-UP, for an access of a user equipment (UE), based on the information regarding the at least one CU-UP connected to the DU.

2. The method of claim 1, wherein the acquiring the information regarding the at least one CU-UP connected to the DU further comprises:
    receiving, by the CU-CP, an F1 setup request message from the DU,
    wherein the F1 setup request message comprises the information regarding the at least one CU-UP connected to the DU, which comprises at least one of an identity of the at least one CU-UP, an Internet protocol (IP) address of the at least one CU-UP, and a name of the at least one CU-UP.

3. The method of claim 2, wherein the information regarding the at least one CU-UP connected to the DU further comprises at least one of a load of the at least one CU-UP, and a load of a transport layer between the DU and the at least one CU-UP.

4. The method of claim 1, wherein the acquiring the information regarding the at least one CU-UP connected to the DU further comprises:
    receiving, by the CU-CP, an F1 access protocol (AP) message from the DU, wherein the F1 AP message comprises the information regarding the at least one CU-UP connected to the DU or information regarding at least one CU-UP selectable for the UE, which comprises at least one of an identity of the at least one CU-UP, an Internet protocol (IP) address of the at least one CU-UP, and a name of the at least one CU-UP.

5. The method of claim 4, wherein the information regarding the at least one CU-UP connected to the DU or the information regarding the at least one CU-UP selectable for the UE further comprises at least one of a load of the at least one CU-UP, and a load of a transport layer between the DU and the at least one CU-UP.

6. A method performed by a centralized unit-control plane (CU-CP) in a mobile communication system, the method comprising:
    acquiring, by the CU-CP in a base station from at least one centralized unit-user plane (CU-UP), information regarding distributed units (DUs) connected to the at least one CU-UP, wherein the information regarding the DUs connected to the at least one CU-UP comprises information on whether interfaces between the DUs and the at least one CU-UP are available; and
    selecting, by the CU-CP, a CU-UP among the at least one CU-UP, for an access of a user equipment (UE), based on the information regarding the DUs connected to the at least one CU-UP.

7. The method of claim 6, wherein the acquiring the information regarding the DUs connected to the at least one CU-UP further comprises:
    transmitting, by the CU-CP, an E1 setup request message to CU-UP, wherein the E1 setup request message comprises an identity of the CU-CP and a list of Tracking Areas (TAs) supported by the CU-CP; and
    receiving, by the CU-CP, an E1 setup response message from the CU-UP, wherein the E1 setup response message comprises an identity of the CU-UP and a list of TAs supported by the CU-UP, and the E1 setup response message further comprises information regarding DUs connected to the CU-UP, which comprises at least one of identities of the DUs, Internet protocol (IP) addresses of the DUs, and names of the DUs.

8. The method of claim 6, wherein the acquiring the information regarding the DUs connected to the at least one CU-UP further comprises:
    receiving, by the CU-CP, an E1 setup request message from CU-UP, wherein the E1 setup request message comprises at least one of an identity of the CU-UP and a name of the CU-UP, and the E1 setup request message further comprises information regarding DUs connected to the CU-UP, which comprises at least one of identities of the DUs, Internet protocol (IP) addresses of the DUs, and names of the DUs; and
    transmitting, by the CU-CP, an E1 setup response message to the CU-UP, wherein the E1 setup response message comprises an identity of the CU-CP and a list of Tracking Areas (TAs) supported by the CU-CP.

9. The method of claim 6, wherein the information regarding the DUs connected to the CU-UP further comprises, at least one of a load of the at least one CU-UP, and loads of transport layers between the DUs and the CU UP.

10. A base station in a mobile communication system, the base station comprising:
  a distributed unit (DU); and
  a centralized unit (CU) comprising a centralized unit-control plane (CU-CP) and at least one centralized unit-user plane (CU-UP),
  wherein the CU-CP is configured to:
    acquire, from the DU, information regarding the at least one CU-UP connected to the DU, wherein the information regarding the at least one CU-UP connected to the DU comprises information on whether an interface between the at least one CU-UP and the DU is available; and
    select a CU-UP among the at least one CU-UP, for an access of a user equipment (UE), based on the acquired information regarding the at least one CU-UP connected to the DU.

11. The base station of claim 10, wherein the CU-CP is further configured to receive an F1 setup request message from the DU, and
  wherein the F1 setup request message comprises the information regarding the at least one CU-UP connected to the DU, which comprises at least one of an identity of the at least one CU-UP, an Internet protocol (IP) address of the at least one CU-UP, and a name of the at least one CU-UP.

12. The base station of claim 11, wherein the information regarding the at least one CU-UP connected to the DU further comprises at least one of a load of the at least one CU-UP, and a load of a transport layer between the DU and the at least one CU-UP.

13. The base station of claim 10, wherein the CU-CP is further configured to receive an F1 access protocol (AP) message from the DU, and
  wherein the F1 AP message comprises the information regarding the at least one CU-UP connected to the DU or information regarding at least one CU-UP selectable for the UE, which comprises at least one of an identity of the at least one CU-UP, an Internet protocol (IP) address of the at least one CU-UP, and a name of the at least one CU-UP.

14. The base station of claim 13, wherein the information regarding the at least one CU-UP connected to the DU or the information regarding the at least one CU-UP selectable for the UE further comprises at least one of a load of the at least one CU-UP, and a load of a transport layer between the DU and the at least one CU-UP.

* * * * *